United States Patent Office 2,851,124
Patented Sept. 9, 1958

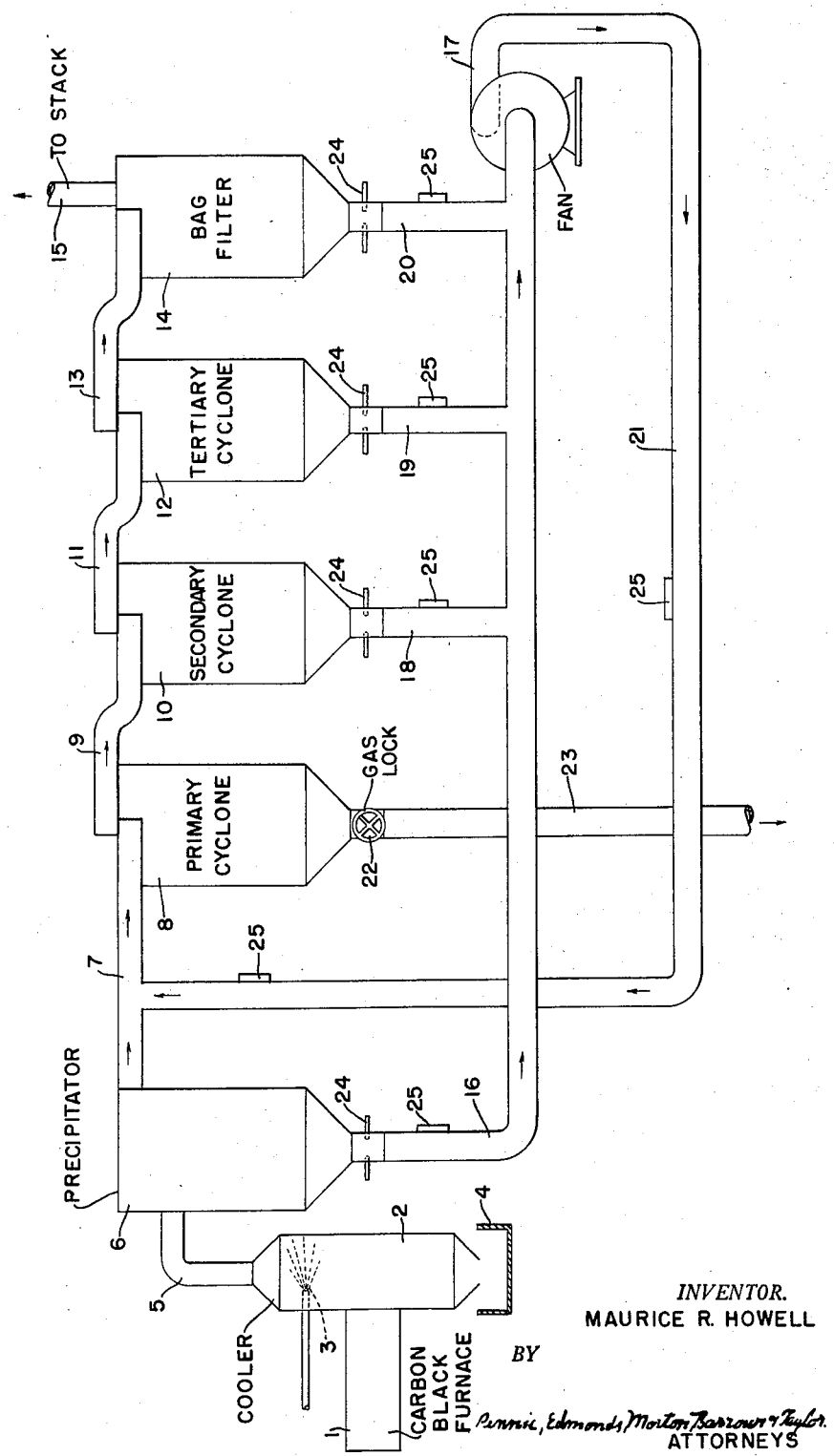

2,851,124
CARBON BLACK SEPARATION

Maurice R. Howell, Monroe, La., assignor to Columbian Carbon Company, New York, N. Y., a corporation of Delaware Application November 28, 1956, Serial No. 624,833

6 Claims. (Cl. 183—34)

This invention relates to the separation of carbon black in a substantially dry state from the effluent gases from a carbon black furnace and to the collection of the carbon black so separated.

In the furnace method of producing carbon black, the carbon black is formed in suspension in hot furnace gases and is carried out of the furnace in suspension in the effluent furnace gases.

In accordance with conventional practice, the hot gaseous suspension from the furnace is first cooled, usually by contact with water sprays, to a temperature in excess of the boiling point of water and is then passed through an agglomerating zone, usually of the so-called electrical precipitator type. From the agglomerating zone, the carbon black suspension is passed through a plurality of series-connected separators and from the final separator the gases, from which the carbon black has been substantially completely removed, are discharged to the atmosphere.

Usually, the series of separators comprise a primary cyclone separator, a secondary cyclone separator, a tertiary cyclone separator and, finally, a bag filter for separating residual carbon before the bases are passed to the stack. A portion of the carbon black is separated in the agglomerating zone and in each of the series of separators and collects in a hopper at the lower ends of the agglomerating, and the respective separating chambers and must be conveyed therefrom, by some means, to a common collection point.

It has heretofore been proposed to effect this collection by mechanical conveyors. But mechanical conveying systems have proven expensive to construct, maintain and operate and, for these and other reasons, have not been found satisfactory.

It has also been proposed to discharge the several portions of the carbon black into a gas stream, distinct from that of the separation system, so that the carbon black is resuspended in the gas and thereby conveyed to some desired point of disposition, and the carbon there separated from the suspension by means of additional cyclone or like separating means. This proposed system has required careful control of the temperature of the conveyor gases to avoid condensation of moisture and careful control of the composition of the conveyor gases to avoid possibilities of explosion or spontaneous combustion or oxidation of the carbon. It has also required the construction, maintenance and operation of one or more separate cyclone separators or the like, which adds substantially to the cost of construction and operation.

It is an object of my present invention to provide a more economical and effective method and apparatus, than heretofore available, for collecting at a common point all of the carbon black separated in the respective zones.

My present invention provides an improved method and apparatus whereby this object is accomplished, all of the separate portions of carbon black being delivered from the system at a single point, with a minimum of additional equipment and operational expense.

This is accomplished in accordance with my invention by conveying, in gaseous suspension, to the inlet of the primary separating chamber all of the separate portions of carbon black collecting in the hoppers of the agglomerating chamber and the other separating chambers, thereby combining all of the separate portions of the carbon black in the hopper of the primary separator, and withdrawing from the hopper at the lower end of the primary separating chamber all of the carbon black produced, from whence it is discharged from the system by any suitable means.

As means for conveying the several portions of separated carbon black to the primary separating zone, I use a portion of the hot furnace gases by drawing hot gases from the lower ends of the respective agglomerating and separating zones, together with the carbon black collected at the lower end of the said zones, in proportions sufficient to entrain and resuspend the respective portions of carbon black. Thus a portion of these hot gases is drawn directly from the lower end of the agglomerating zone, at which point the gas temperature is well in excess of the dew point and, therefore, no danger of moisture condensation is encountered.

The invention will be further described and illustrated by the following detailed description of a presently preferred embodiment thereof with reference to the following drawing which represents conventionally and diagrammatically an elevational view of a carbon black plant including my separating and collecting system. It will be understood that this drawing is not intended to be scaled and that the invention is not restricted to this illustrative embodiment there.

In the drawing, a carbon black furnace is represented at 1, which leads at its downstream end into a vertical cooler 2 provided with one or more water sprays represented at 3, whereby the suspension is cooled to a temperature usually about 500° F. Any water from the sprays which escapes vaporization drops from the lower end of the cooler into trough 4.

The somewhat cooled, but still hot, gaseous suspension of carbon black passes from the cooler through conduit 5 into the upper end of an electrical precipitator chamber represented at 6 whereby the finely dispersed particles are, to a considerable extent, agglomerated to facilitate their subsequent separation.

From the upper end of the agglomerating chamber, the suspension passes through conduit 7 into the upper end of a primary cyclone separator 8. A portion of carbon black is separated from the suspension in the chamber 6 and a further portion is separated in the primary cyclone separator.

The hot gases pass from the latter, still carrying a substantial portion of carbon black in suspension, through conduit 9 into the upper end of the secondary cyclone separator 10, in which a further portion of the carbon black is separated, and from which the suspension passes through conduit 11 into the upper end of the tertiary separator 12.

Further carbon black is separated in the tertiary separator, and the gases carrying residual carbon black in suspension pass from the upper end of that separator through conduit 13 into the upper end of a final separator chamber in the form of a bag filter chamber 14 of conventional type. The tail gases, substantially free from carbon black, are discharged from the upper end of the latter chamber through conduit 15 to a stack or are otherwise released into the atmosphere.

The construction of the precipitator and the various separators is well known to the art and need not here be further described.

It will be understood that in place of the bag filter, other means for separating residual dry carbon black may be used. Also, in place of a single secondary cyclone, for instance, two or more such separators may be connected in parallel. This equally applies to the tertiary cyclone separator and the bag filter chamber. It will also be understood that the invention is not restricted as to the type of carbon black furnace or the cooling system with which it is used.

In each of the chambers, as previously noted, a portion of the carbon black is separated and collects in the hopper forming the lower end of the chamber and must be conveyed to a common point for final disposition. This is accomplished in the apparatus described by connecting the lower end of chamber 6 by means of conduit 16 to the inlet side of a fan 17 and connecting the lower ends of the secondary and tertiary cyclones and the bag filter to conduit 16 at points ahead of the fan 17 through conduits 18, 19 and 20, respectively. The outlet of fan 17 is connected by conduit 21 with the upper end of the primary cyclone separator through conduit 7 leading thereto from the precipitator 6.

At the lower end of the primary cyclone 8, there is provided a gas-lock valve 22, for instance of the star-valve type or other well-known types of valves adapted to the discharge of solids with a minimum gas flow. The conduit 23 leads from valve 22 to the point of disposition of the carbon black yield, for instance a densing tank or pelleting apparatus.

In operation, as previously noted, carbon black collects in the lower ends of each of the chambers 6, 10, 12 and 14, respectively, the proportions of the entire yield collecting in the respective chambers varying somewhat with the type of furnace black being produced, as hereinafter more fully discussed.

By reason of the action of fan 17, the carbon black collecting in the hoppers of these chambers is sucked into conduit 16 together with a portion of the gas present in the particular chamber, the proportion of gas drawn into conduit 16 from the respective chambers being so adjusted as to entrain the carbon black. For larger amounts of carbon black, a greater proportion of gas will be withdrawn.

For controlling the amount of gas so withdrawn from the respective chambers, I provide orifices 24, advantageously adjustable so that they may be opened or closed to the necessary extent to permit the flow of the desired amount of the gas. Any of a number of available types of flow control orifices may be used for this purpose. It is entirely unnecessary, and even undesirable, to use the more expensive gas-lock valves, such as have been proposed for other carbon black separating and collecting systems.

Further, to promote the steady flow of carbon black from the respective chambers into conduit 16 and from thence to primary separator 8, I have sometimes found it desirable to place at strategic points along the conduits apparatus of known type adapted to rap or tap the conduit. Such devices are diagrammatically indicated at points 25. However, this is not an essential feature of my present invention.

The amount of gas required to resuspend and convey the carbon black is subject to some variation, but usually should approximate at least 30 cubic feet of gas per pound of black in the main conveyor conduits.

For example, in separating apparatus of the type represented in the drawing and adapted to be used with a carbon black furnace having a capacity of 100,000 pounds of carbon black per twenty-four hour day, the precipitator, the cyclone separators and the bag separator should each be of a capacity capable of handling 50,000–60,000 cubic feet of the gaseous suspension per minute. The conveyor tubes 16 and 21 should be at least six inches in diameter in order to prevent arching of the black within the tube and plugging of the tube.

The gas velocity in conveyor tube 21, and in conveyor tube 16 at the point where all of the black has been collected, should be of the order of 3000–4000 feet per minute.

In the operation of apparatus of this type and capacity but using a conventional collecting system in place of that of my present invention, the approximate proportion of the entire yield separated in the respective chambers will vary, depending upon the type of black being produced, as indicated in the following table:

Table I

| Type of Black | Precipitator, Percent | Primary Cyclone, Percent | Secondary Cyclone, Percent | Tertiary Cyclone, Percent | Bag Collector |
|---|---|---|---|---|---|
| SRF | 27 | 64 | 3.6 | 2.5 | None used. |
| FF | 4 | 58 | 22 | 10 | None used. |
| HMF | 4 | 78 | 5 | 2 | None used. |
| FEF | 4 | 60 | 20 | 10 | 6%. |
| HAF | 3 | 55 | 22 | 10 | 10. |
| ISAF | 3 | 48 | 27 | 12 | 10. |

The above values are for average operating conditions and may vary as much as 20% in either direction, in the primary cyclone, and several hundred percentage with respect to the lower values given for the precipitator.

Using this apparatus, modified in accordance with the present invention, as shown in the drawing, for the separation and collection of HAF type of black, for instance, gas and carbon black were withdrawn from the lower end of the respective chambers in the proportions indicated in the following tabulation:

Table II

| Collector | lbs./min. Collected | Gas Volume, Cu. ft./min. | From Hopper, Concentration, Cu. ft. gas/# | In Conveyor, Concentration in Cu. ft. Gas/# |
|---|---|---|---|---|
| Precipitator | 2 | 600 | 300 | 300 |
| Secondary Cyclone | 15.3 | 300 | 20 | 51.5 |
| Tertiary Cyclone | 7.0 | 300 | 43 | 49 |
| Bag Collector | 7.0 | 300 | 43 | 48 |

It will be understood that the proportions of gas withdrawn from the respective collection chambers may be varied substantially from those given in the foregoing illustrations and frequently may, with advantage, be twice those given in the foregoing tabulation.

In apparatus of the capacity illustrated, the fan should have a minimum capacity of about 1500 cubic feet per minute. It should be capable of developing sufficient head to overcome line losses and maintain the necessary pressure differential at the outlet of the collector hoppers to effect the removal of the carbon black from the respective hoppers as fast as it accumulates therein, along with adequate gas to effect the entrainment. A pressure differential of 6–10 inches of water has usually been found adequate for that purpose.

In addition to the low cost of installation and maintenance and economical operation, the invention has the advantage of effecting a better and more uniform blending of all of the carbon black produced. Further, it has been observed in conventional operation that the carbon black collected in the bag filter, where the temperature of the gases has been substantially reduced, frequently contains a higher proportion of sulphur. By returning this portion of the carbon black to the higher temperature primary cyclone, in accordance with my invention, the sulphur content of that portion of the carbon black is materially reduced. The moisture content of that portion of the carbon black collected in the bag filter is also materially reduced.

In some operations, it has been proposed to pass the gaseous suspension through a cyclone separator preceding the agglomerating chamber. It will be understood that my invention, in its broader aspect, contemplates such operations and that the carbon black accumulating in the hopper of such preliminary cyclone may be collected in the manner described for collecting and combining the carbon black from the other chambers.

Also, under some operating conditions, it has been found feasible to omit the precipitator entirely, the gaseous suspension being passed directly to the series of cyclone separators. The invention is likewise applicable to systems of that type.

Further, though I have specifically described and illustrated an aspect of the invention whereby the carbon black is collected in, and withdrawn from the system from the first separating chamber following the precipitator, the invention, in its broader aspect, also contemplates the return of the respective portions of separated carbon black to one of the other separating chambers of the series and withdrawing the entire production from such other chamber.

Should it be desired, for any reason, to separately collect that portion of the black separated in any particular chamber, for instance the bag filter, such chamber may be excluded from my collection system, without departing from the spirit or scope of this invention.

I claim:

1. In the separation of carbon black from hot gaseous suspensions thereof by passing the hot suspension successively through an agglomerating chamber and thence through a plurality of series-connected separator chambers, in each of which chambers a portion of the carbon black is separated and deposited in the lower end thereof, the method of collecting and combining the several portions of the separated carbon black which comprises withdrawing the separated carbon black from the lower end of each of said chambers, except the first separator chamber, entrained in gas passed to that chamber sufficient to entrain the carbon black, passing the withdrawn carbon black and entraining gas into the upper portion of the first separator chamber and withdrawing from the lower end of the first separator chamber substantially all of the carbon black contained in the initial hot gaseous suspension and discharging it from the system.

2. In the separation of carbon black from hot gaseous suspensions thereof by passing the hot suspension successively through an agglomerating chamber, a primary cyclone separator, a secondary cyclone separator and a tertiary cyclone separator connected in series, a portion of the carbon black being separated and deposited in the lower end of the agglomerating chamber and each of said cyclone separators, the method of collecting and combining the several portions of the separated carbon black which comprises withdrawing the separated carbon black from the lower ends of the agglomerating chamber and the secondary and tertiary separators, respectively, entrained in gas passed to that chamber sufficient to entrain the carbon black, passing the withdrawn carbon black and entraining gas into the upper portion of the primary cyclone separator and withdrawing from the lower end of the last said separator substantially all of the carbon black contained in the initial hot gaseous suspension and discharging it from the system.

3. In the separation of carbon black from hot gaseous suspensions thereof by passing the hot suspension successively through an agglomerating chamber, a primary cyclone separator, a secondary cyclone separator, a tertiary cyclone separator and a bag filter chamber, all connected in series, a portion of the carbon black being separated and deposited in the lower end of the agglomerating chamber, each of said cyclone separators and the bag filter chamber, the method of collecting and combining the several portions of the separated carbon black which comprises withdrawing the separated carbon black from the lower ends of the agglomerating chamber, the secondary and tertiary separators and the bag filter chamber, respectively, entrained in gas passed to that chamber sufficient to entrain the carbon black, passing the withdrawn carbon black and entraining gas into the upper portion of the primary cyclone separator and withdrawing from the lower end of the last said separator substantially all of the carbon black contained in the initial hot gaseous suspension and discharging it from the system.

4. Apparatus for separating carbon black from gaseous suspensions thereof including an agglomerating chamber and a plurality of series-connected separator chambers, a hopper in the lower end of each of said chambers, for the accumulation of carbon black separated therein, conduit means for delivering the suspension to the upper portion of the agglomerating chamber and an outlet from the lower end of each of said hoppers, in combination with means for collecting the carbon black deposited in the respective hoppers comprising a fan, collection conduits connecting the outlet from each of said hoppers, except the hopper of the first said separator chamber, directly with the intake to the fan, a conduit leading from the outlet of the fan directly to the inlet of the first separator chamber and a delivery conduit leading from the hopper of said first separator chamber for discharge of substantially all of the carbon black delivered to the agglomerating chamber.

5. Apparatus for separating carbon black from gaseous suspensions thereof including an agglomerating chamber, a primary cyclone separator, a secondary cyclone separator and a tertiary cyclone separator, all connected in series, the lower end of each constituting a hopper for the accumulation of carbon black separated therein, conduit means for delivering the suspension to the upper portion of the agglomerating chamber and an outlet from the lower end of each of said hoppers, in combination with means for collecting the several portions of carbon black deposited in the respective hoppers, comprising a fan, a collection conduit leading directly to the intake to the fan, conduit means connecting the outlets from each of said hoppers, excepting that of the primary cyclone separator, directly with said collecting conduit, conduit means leading from the outlet of the fan directly to the inlet of the primary cyclone separator and a delivery conduit leading from the hopper outlet of the primary cyclone separator for discharge of substantially all of the carbon black delivered to the agglomerator chamber.

6. Apparatus for separating carbon black from gaseous suspensions thereof including an agglomerating chamber, a primary cyclone separator, a secondary cyclone separator, a tertiary cyclone separator, and a bag filter, all connected in series, the lower end of each constituting a hopper for the accumulation of carbon black separated therein, conduit means for delivering the suspension to the upper portion of the agglomerating chamber and an outlet from the lower end of each of said hoppers, in combination with means for collecting the several portions of carbon black deposited in the respective hoppers, comprising a fan, a collection conduit leading directly to the intake to the fan, conduit means connecting the outlets from each of said hoppers, excepting that of the primary cyclone separator, directly with said collecting conduit, conduit means leading from the outlet of the fan directly to the inlet of the primary cyclone separator and a delivery conduit leading from the hopper outlet of the primary cyclone separator for discharge of substantially all of the carbon black delivered to the agglomerator chamber.

References Cited in the file of this patent

UNITED STATES PATENTS

| | | |
|---|---|---|
| 2,717,658 | Bethea et al. | Sept. 13, 1955 |
| 2,771,158 | Bray et al. | Nov. 20, 1956 |